(12) United States Patent
Sohn et al.

(10) Patent No.: US 10,337,216 B2
(45) Date of Patent: Jul. 2, 2019

(54) VEHICLE DOOR

(71) Applicant: Strattec Power Access LLC, Troy, MI (US)

(72) Inventors: John M. Sohn, Grosse Pointe, MI (US); Paul S. Crociata, Farmington Hills, MI (US)

(73) Assignee: STRATTEC POWER ACCESS LLC, Auburn Hills, MI (US)

( * ) Notice: Subject to any disclaimer, the term of this patent is extended or adjusted under 35 U.S.C. 154(b) by 473 days.

(21) Appl. No.: 14/585,521

(22) Filed: Dec. 30, 2014

(65) Prior Publication Data

US 2015/0188345 A1  Jul. 2, 2015

Related U.S. Application Data

(60) Provisional application No. 61/923,059, filed on Jan. 2, 2014.

(51) Int. Cl.
*B60R 16/027* (2006.01)
*E05B 81/12* (2014.01)
*E05F 15/632* (2015.01)
*E05B 81/70* (2014.01)
*E05F 15/659* (2015.01)
(Continued)

(52) U.S. Cl.
CPC .............. *E05B 81/13* (2013.01); *E05B 81/62* (2013.01); *E05B 81/64* (2013.01); *E05B 81/68* (2013.01); *E05B 81/70* (2013.01); *E05F 15/40* (2015.01); *E05F 15/632* (2015.01); *E05F 15/659* (2015.01); *E05F 15/695* (2015.01); *B60R 16/027* (2013.01); *E05Y 2900/531* (2013.01)

(58) Field of Classification Search
None
See application file for complete search history.

(56) References Cited

U.S. PATENT DOCUMENTS 3,653,154 A  4/1972  Hayday
4,121,382 A  10/1978  Dietrich et al.
(Continued)

FOREIGN PATENT DOCUMENTS

DE  4113391  11/1991
DE  4132293  4/1992
(Continued)

OTHER PUBLICATIONS

Toyota, Tecno brochure, dated Aug. 1995, publicly available at least as early as Apr. 7, 2006.
(Continued)

*Primary Examiner* — Thomas J. Hiltunen
(74) *Attorney, Agent, or Firm* — Michael Best & Friedrich LLP

(57) ABSTRACT

A power system for a vehicle having a vehicle body and door includes a first battery disposed on the vehicle body, a second, rechargeable battery disposed on the door, a first electrical contact disposed on the vehicle body, and a second electrical contact disposed on the vehicle door. The first and second electrical contacts are coupled to the first and second batteries such that when the door is in a fully closed position relative to the vehicle body the first and second batteries are electrically coupled to one another and the second battery is charged by the first battery, and when the door is not in a fully closed position the first and second batteries are electrically de-coupled from one another.

24 Claims, 2 Drawing Sheets

(51) Int. Cl.
  *E05F 15/695* (2015.01)
  *E05B 81/68* (2014.01)
  *E05B 81/64* (2014.01)
  *E05B 81/62* (2014.01)
  *E05F 15/40* (2015.01)

(56) References Cited

U.S. PATENT DOCUMENTS

| | | | |
|---|---|---|---|
| 4,163,432 A | 8/1979 | Hertfelder | |
| 4,184,577 A | 1/1980 | Miller | |
| 4,191,068 A | 3/1980 | Jardin et al. | |
| 4,223,927 A | 9/1980 | Kobayashi et al. | |
| 4,257,001 A | 3/1981 | Partain et al. | |
| 4,281,475 A | 8/1981 | Spadoni-Censi | |
| 4,285,421 A | 8/1981 | Halsted | |
| 4,462,185 A | 7/1984 | Shibuki et al. | |
| 4,530,185 A | 7/1985 | Moriya et al. | |
| 4,566,576 A | 1/1986 | Moriya et al. | |
| 4,640,050 A | 2/1987 | Yamagishi et al. | |
| 4,644,693 A | 2/1987 | Wang | |
| 4,744,449 A | 5/1988 | Selella et al. | |
| 4,763,936 A | 8/1988 | Rogakos et al. | |
| 4,880,199 A | 11/1989 | Harney | |
| 4,916,861 A | 4/1990 | Schap | |
| 4,932,715 A | 6/1990 | Kramer | |
| 4,945,677 A | 8/1990 | Kramer | |
| 4,952,080 A | 8/1990 | Boiucaner et al. | |
| 4,966,045 A | 10/1990 | Harney | |
| 4,984,668 A | 1/1991 | Onishi et al. | |
| 5,004,280 A | 4/1991 | Schap | |
| 5,014,958 A | 5/1991 | Harney | |
| 5,039,925 A | 8/1991 | Schap | |
| 5,046,283 A | 9/1991 | Compeau et al. | |
| 5,066,056 A | 11/1991 | Schap | |
| 5,076,016 A | 12/1991 | Adams et al. | |
| 5,105,131 A | 4/1992 | Schap | |
| 5,127,190 A | 7/1992 | Hein et al. | |
| 5,138,795 A | 8/1992 | Compeau et al. | |
| 5,168,666 A | 12/1992 | Koura et al. | |
| 5,239,779 A * | 8/1993 | DeLand | B60J 5/06 |
| | | | 49/360 |
| 5,263,762 A | 11/1993 | Long et al. | |
| 5,295,038 A | 3/1994 | Matsushita et al. | |
| 5,313,795 A | 5/1994 | Dunn | |
| 5,316,365 A | 5/1994 | Kuhlman et al. | |
| 5,319,880 A | 6/1994 | Kuhlman | |
| 5,319,881 A | 6/1994 | Kuhlman | |
| 5,323,570 A | 6/1994 | Kuhlman et al. | |
| 5,347,755 A | 9/1994 | Jaster et al. | |
| 5,350,986 A | 9/1994 | Long et al. | |
| 5,351,439 A | 10/1994 | Takeda et al. | |
| 5,389,920 A * | 2/1995 | DeLand | B60J 5/06 |
| | | | 340/12.5 |
| 5,396,158 A | 3/1995 | Long et al. | |
| 5,434,487 A | 7/1995 | Long et al. | |
| 5,477,093 A | 12/1995 | Lamb | |
| 5,477,094 A | 12/1995 | Lamb | |
| 5,507,119 A | 4/1996 | Sumiya et al. | |
| 5,582,279 A | 12/1996 | Buchanan, Jr. et al. | |
| 5,640,807 A * | 6/1997 | Shigematsu | E05B 81/20 |
| | | | 292/DIG. 23 |
| 5,668,424 A | 9/1997 | Lamb | |
| 5,691,587 A | 11/1997 | Lamb | |
| 5,737,876 A | 4/1998 | Dowling | |
| 5,755,059 A | 5/1998 | Schap | |
| 5,813,282 A | 9/1998 | Azuma | |
| 5,836,639 A * | 11/1998 | Kleefeldt | E05B 81/22 |
| | | | 296/155 |
| 5,867,940 A | 2/1999 | Watanaba et al. | |
| 5,892,340 A * | 4/1999 | Sasajima | B60R 16/027 |
| | | | 318/286 |
| 5,906,071 A | 5/1999 | Buchanan, Jr. | |
| 5,909,073 A | 6/1999 | Lamb | |
| 5,913,563 A | 6/1999 | Watanabe et al. | |
| 5,979,114 A | 11/1999 | Clark et al. | |
| 5,982,126 A | 11/1999 | Hellinga et al. | |
| 6,009,671 A | 1/2000 | Sasaki et al. | |
| 6,032,415 A | 3/2000 | Tajima | |
| 6,037,727 A * | 3/2000 | Kawanobe | B60J 5/06 |
| | | | 318/286 |
| 6,043,644 A | 3/2000 | de Coulon et al. | |
| 6,089,649 A * | 7/2000 | Hamada | B60J 5/062 |
| | | | 292/201 |
| 6,100,619 A | 8/2000 | Buscher et al. | |
| 6,114,820 A | 9/2000 | Nishigaya | |
| 6,125,586 A | 10/2000 | Buscher | |
| 6,134,836 A | 10/2000 | Kawanobe et al. | |
| 6,164,015 A * | 12/2000 | Kawanobe | E05F 15/646 |
| | | | 49/360 |
| 6,179,742 B1 | 1/2001 | Haag et al. | |
| 6,199,322 B1 | 3/2001 | Itami et al. | |
| 6,216,393 B1 | 4/2001 | Apprich | |
| 6,231,113 B1 | 5/2001 | Armbruster et al. | |
| 6,247,373 B1 | 6/2001 | Bree et al. | |
| 6,270,148 B1 | 8/2001 | Noda et al. | |
| 6,270,149 B1 | 8/2001 | Fukumoto et al. | |
| 6,313,795 B1 | 11/2001 | Herrmann et al. | |
| 6,397,523 B1 | 6/2002 | Fukumoto et al. | |
| 6,405,485 B1 | 6/2002 | Itami et al. | |
| 6,408,573 B1 | 6/2002 | Fukumoto et al. | |
| 6,425,206 B1 | 7/2002 | Noda et al. | |
| 6,430,875 B1 | 8/2002 | Clark et al. | |
| 6,456,047 B1 * | 9/2002 | Gohara | H02J 7/025 |
| | | | 320/104 |
| 6,460,295 B1 | 10/2002 | Johnson et al. | |
| 6,464,287 B2 | 10/2002 | Rogers, Jr. et al. | |
| 6,481,783 B1 | 11/2002 | Rogers, Jr. et al. | |
| 6,517,365 B1 * | 2/2003 | Bungo | B60J 5/06 |
| | | | 296/155 |
| 6,535,133 B2 * | 3/2003 | Gohara | B60J 5/06 |
| | | | 320/108 |
| 6,575,864 B1 | 6/2003 | Dean | |
| 6,588,829 B2 | 7/2003 | Long et al. | |
| 6,669,247 B2 | 12/2003 | Swan | |
| 6,736,646 B2 * | 5/2004 | Takahashi | H01R 13/6633 |
| | | | 439/39 |
| 6,863,336 B2 | 3/2005 | Yokomori et al. | |
| 6,964,449 B2 | 11/2005 | Takeda et al. | |
| 7,070,213 B2 * | 7/2006 | Willats | E05B 81/76 |
| | | | 292/201 |
| 7,267,391 B2 * | 9/2007 | Yokomori | B60J 5/06 |
| | | | 296/155 |
| 7,686,378 B2 * | 3/2010 | Gisler | E05F 15/43 |
| | | | 296/146.4 |
| 7,830,107 B2 * | 11/2010 | Inoue | E05F 15/695 |
| | | | 318/434 |
| 7,941,972 B2 * | 5/2011 | Kamiya | E05F 15/40 |
| | | | 296/155 |
| 8,988,189 B2 * | 3/2015 | Kim | E05B 77/14 |
| | | | 340/5.72 |
| 9,080,367 B2 * | 7/2015 | Orton | E05F 15/70 |
| 2001/0022049 A1 | 9/2001 | Clark et al. | |
| 2002/0117896 A1 * | 8/2002 | Gohara | B60L 1/003 |
| | | | 307/10.1 |
| 2003/0046872 A1 | 3/2003 | Fukumura | |
| 2003/0106757 A1 | 6/2003 | Johnson et al. | |
| 2004/0216383 A1 | 11/2004 | Rogers, Jr. et al. | |
| 2005/0275363 A1 * | 12/2005 | Honma | E05F 15/659 |
| | | | 318/280 |
| 2006/0202507 A1 * | 9/2006 | Miyagawa | B60J 5/06 |
| | | | 296/155 |
| 2008/0238135 A1 * | 10/2008 | Takeda | B60R 25/24 |
| | | | 296/146.4 |
| 2015/0283886 A1 * | 10/2015 | Nania | E05F 15/73 |
| | | | 296/146.4 |

FOREIGN PATENT DOCUMENTS

| | | |
|---|---|---|
| DE | 4041480 | 6/1992 |
| DE | 19712185 | 3/1998 |
| DE | 19714214 | 10/1998 |

(56) References Cited

FOREIGN PATENT DOCUMENTS

| | | |
|---|---|---|
| DE | 19724009 | 12/1998 |
| EP | 0421776 | 4/1991 |
| EP | 0626498 | 1/1997 |
| EP | 0625625 | 3/1997 |
| EP | 0625815 | 3/1997 |
| EP | 0609585 | 4/1997 |
| EP | 0611869 | 5/1997 |
| EP | 0980776 | 2/2000 |
| FR | 2603647 | 3/1988 |
| GB | 2097855 | 11/1982 |
| GB | 2323124 | 9/1998 |
| JP | S52-55117 | 5/1977 |
| JP | S55-30060 | 3/1980 |
| JP | 57111972 | 7/1982 |
| JP | 57117171 | 7/1982 |
| JP | 58028115 | 2/1983 |
| JP | 358030827 | 2/1983 |
| JP | S61-36481 | 2/1986 |
| JP | 07067293 | 3/1995 |
| JP | 2000-160933 | 6/2000 |
| JP | 2000177391 | 6/2000 |
| WO | 2004025063 | 3/2004 |

OTHER PUBLICATIONS

Posic, Digital Inductive Position, Speed and Direction Sensor, P01210, P01210-DS-V2B, pp. 1-3, publicly available at least as early as Apr. 7, 2006.
Posic, Application Note—Mechanical and Electrical Interfacing of P01210, dated Jul. 6, 2002, pp. 1-8.
Posic, Preliminary P01230 Inductive Thumbwheel Sensor, 2 pages, publicly available at least as early as Apr. 7, 2006.
Posic, Evaluation Kit for P01210 Digital Inductive Position Sensor, P01201EVK, pp. 1-4, publicly available at least as early as Apr. 7, 2006.
Circuit Cellar, Inductive Sensors, Issue 132, dated Jul. 2001, pp. 1-4.
Electronic Design, A Penton Publication, Integration and Inductive Sensing Combine to Improve Automotive/Industrial Sensing, dated Jul. 12, 1999, 2 pages.
A Design Tool for Inductive Position and Speed Sensors via a Fast Integral Equation Based Method, by Mattan Kamon, Anne-Marie Nguyen, John R. Gilbert, 5 pages, publicly available at least as early as Apr. 7, 2006.
Posic Sensor+ Test 2005, 8 pages.
Microcoil Speed and Position Sensor for Automotive Applications, Microsystem Technologies, by Y. de Coulon, C. Bourgeois, H. de Lambilly, J. Bergqvist, P. Roze, P. Biton, dated 1997, pp. 61-63.
Posic, Microcoil Inductive Position Sensor, 1 page, publicly available at least as early as Apr. 7, 2006.
Posic, Preliminary P01230 Inductive Thumbwheel Sensor, 1 page, publicly available at least as early as Apr. 7, 2006.
Allegro Microsystems, Inc., ATS650LSH—Preliminary Data Sheet, Two-Wire, Direction-Detection Gear Tooth Sensor with Diagnostic Output, dated Aug. 12, 2003, pp. 1-6.
Posic, Press Release: Posic SA created as a spin off from SCEM, Swiss Center for Electronics and Microtechnology, 2001.
Posic, Press Release: Posic develops inductive thumbwheel sensor, 2002.
Posic, Press Release: Posic launches new evaluation kit, 2003.

* cited by examiner

VEHICLE DOOR

CROSS-REFERENCE TO RELATED APPLICATIONS

This application claims priority to U.S. Provisional Application No. 61/923,059, filed Jan. 2, 2014, the entire contents of which are incorporated herein by reference.

FIELD OF THE INVENTION

The present invention relates to vehicle doors, and more particularly to remote and wireless power systems for a vehicle door.

BACKGROUND OF THE INVENTION

Mini-vans and other vehicles commonly have a vehicle body and a sliding side door or doors that are coupled to the vehicle body. The sliding doors are opened and closed to access passenger and storage areas inside the vehicle. Current sliding doors typically include one or more electrical components that are powered by a battery located in the vehicle body. The battery is coupled to the electrical components through a wiring harness that extends between the vehicle body and the sliding door.

SUMMARY OF THE INVENTION

According to one construction, a power system for a vehicle having a vehicle body and door includes a first battery disposed on the vehicle body, a second, rechargeable battery disposed on the door, a first electrical contact disposed on the vehicle body, and a second electrical contact disposed on the vehicle door. The first and second electrical contacts are coupled to the first and second batteries such that when the door is in a fully closed position relative to the vehicle body the first and second batteries are electrically coupled to one another and the second battery is charged by the first battery, and when the door is not in a fully closed position the first and second batteries are electrically de-coupled from one another.

According to another construction, a method of operating a power system for a vehicle having a vehicle body and door includes engaging a first electrical contact on the vehicle body with a second electrical contact on the vehicle door by closing the vehicle door, the first electrical contact coupled to a first battery disposed in the vehicle body and the second electrical contact coupled to a second, rechargeable battery disposed in the door. The method also includes charging the second battery with the first battery after the first and second electrical contacts have been engaged. The method also includes opening the door to disengage the first and second electrical contacts. The method also includes powering an electrical component disposed in the door with the second battery.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
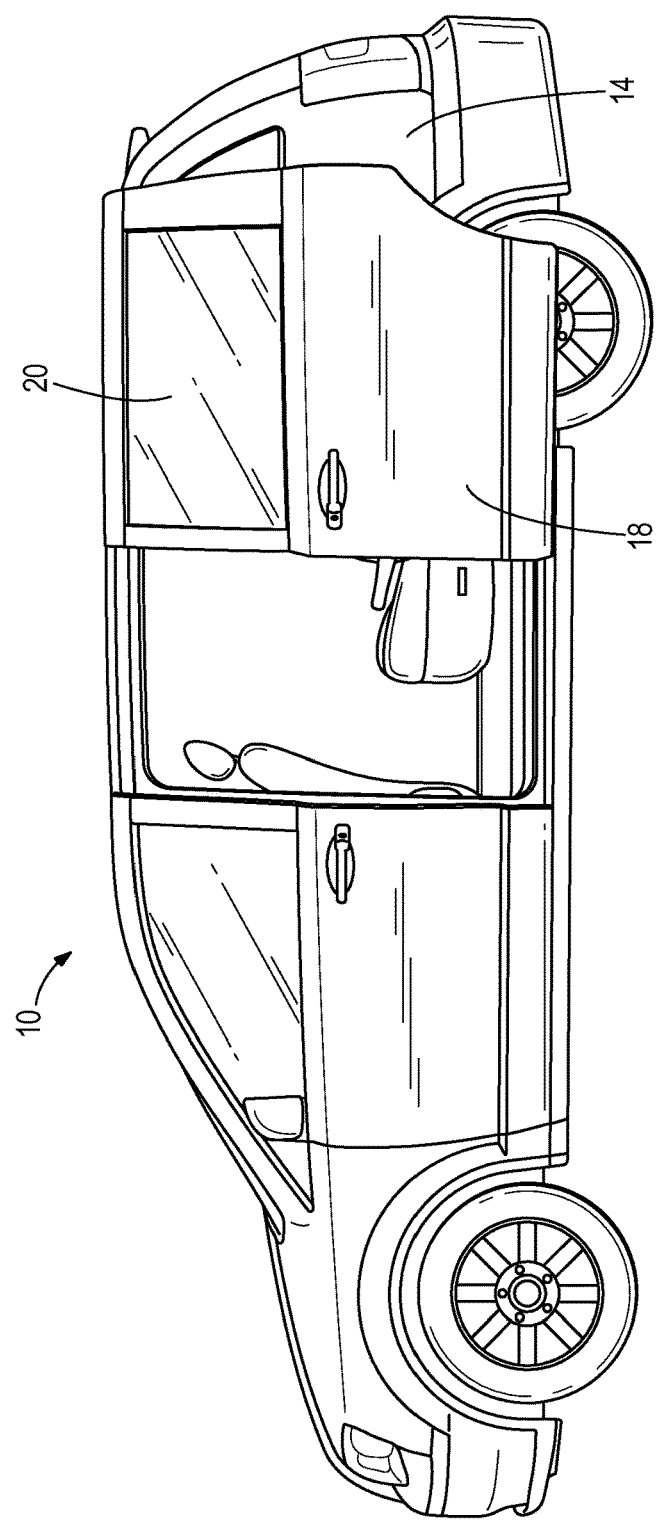
FIG. 1 is a schematic illustration of a vehicle.

FIG. 1 illustrates a vehicle 10 that includes a vehicle body 14 and a sliding door 18 coupled to the vehicle body 14, the sliding door 18 including a window 20. The illustrated vehicle 10 is a mini-van, although other constructions include different types of vehicles, including sedans, SUVs, and other vehicles with at least one door.

Figure 2:
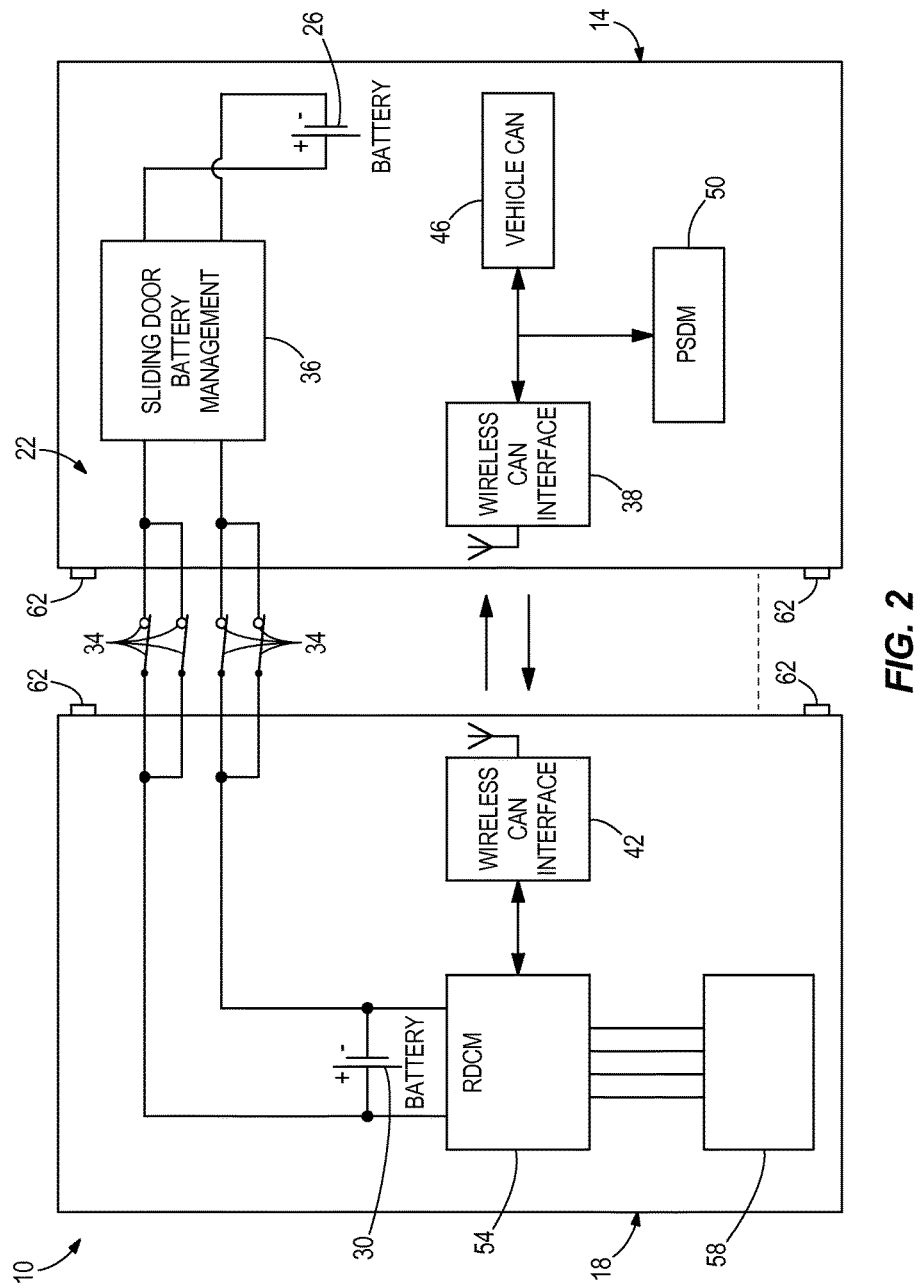
FIG. 2 is a schematic illustration of a wireless power system according to one construction of the invention for the vehicle of FIG. 1.

With reference to FIG. 2, the vehicle 10 includes a wireless power system 22 that provides power to one or more components inside the sliding door 18. The power system 22 includes a first battery 26 disposed on the vehicle body 14, and a second, rechargeable battery 30 disposed on the sliding door 18. The second battery 30 is a rechargeable lithium ion battery, although other constructions include different types of batteries (e.g., nickel cadmium, nickel metal hydride, sealed lead acid, etc.)

The two batteries 26, 30 are releasably, electrically coupled together through a set of electrical contacts 34 disposed on both the vehicle body 14 and the sliding door 18. In the illustrated construction the electrical contacts 34 include four electrical contacts 34 on the vehicle body 14 and four electrical contacts 34 on the sliding door 18. The electrical contacts 34 are pads and plungers. Other constructions include other types and numbers of electrical contacts 34. The electrical contacts 34 are arranged such that when the sliding door 18 is in a fully closed (e.g., latched) position relative to the vehicle body 14, the electrical contacts 34 on the sliding door 18 contact the electrical contacts 34 on the vehicle body 14 and form an electrical coupling between the first and second batteries 26, 30. The electrical coupling between the first and second batteries 26, 30 charges the second battery 30 (e.g., via electrical connection with the first battery 26). When the sliding door 18 is not in a fully closed position (e.g. when the sliding door 18 is unlatched and partially or fully open), the electrical contacts 34 on the sliding door 18 do not contact the electrical contacts 34 on the vehicle body 14, and the first and second batteries 26, 30 are not electrically coupled. In the illustrated construction, the power system 22 also includes a battery management device 36 (e.g., controller) in the vehicle body 14 to manage and/or monitor the charging of the second battery 30 in the sliding door 18.

With continued reference to FIG. 2, the power system 22 also includes a first wireless controller area network interface 38 disposed on the vehicle body 14, and a second wireless controller area network interface 42 disposed the sliding door 18. The interfaces 38, 42 communicate with one another back and forth to send one or more signals between the vehicle body 14 and the sliding door 18. The first interface 38 is coupled to a vehicle controller area network 46, as well as to a power sliding door module 50, both of which are disposed on the vehicle body 14. The network 46 and the module 50 provide one or more signals to the first interface 38 that are relayed wirelessly via the first interface 38 to the second interface 42. The network 46 and the module 50 also receive signals sent wirelessly from the second interface 42 to the first interface 38.

With continued reference to FIG. 2, the power system 22 also includes a door (e.g., rear door) control module 54 and a set of electrical components 58 (e.g., a cinching latch, door window motor, etc.) controlled by the control module 54. The control module 54 and the electrical components 58 are disposed on the sliding door 18. The control module 54 is coupled to and controls operation and activation of the electrical components 58. For example, when activated by the control module 54, a cinching latch on the sliding door 18 closes and latches the sliding door 18 into the fully closed position. Similarly, when activated by the control module 54, a door window motor on the sliding door 18 raises or lowers the window 20 on the sliding door 18.

With continued reference to FIG. 2, the control module 54 is coupled to the second interface 42 and receives one or more signals from the second interface 42. The signals received from the second interface are used by the control module 54 to control one or more of the electrical components 58. For example, when a passenger in the vehicle body 14 presses a door open/close button on console in the vehicle body 14, a signal is sent from the first interface 38 to the second interface 42 and from the second interface 42 to the control module 54. Based on the signal received from the second interface 42, the control module 54 activates the cinching latch on the sliding door 18 to either release the sliding door 18, or to latch the sliding door 18. Similarly, when the driver in the vehicle body 14 presses a window up/down button on the driver door in the vehicle body 14, a signal is sent from the first interface 38 to the second interface 42, and from the second interface 42 to the control module 54. Based on the signal received from the second interface 42, the control module 54 activates the door window motor on the sliding door 18 to raise or lower the window 20 on the sliding door 18.

With continued reference to FIG. 2, the second, rechargeable battery 30 is coupled to the control module 54, the second interface 42, and the electrical components 58. The second battery 30 provides power for the control module 54, the second interface 42, and the electrical components 58 when the sliding door 18 is in a fully closed position, as well as when the sliding door 18 is not in a fully closed position. When the sliding door 18 is not in a fully closed position the second battery 30 provides the sole power to the control module 54, the second interface 42, and the electrical components 58, without the assistance of any additional power source and without any electrical harnesses extending between the vehicle body 14 and the sliding door 18. In other constructions, one or more additional power sources (e.g., additional batteries) are provided on the sliding door 18 to provide auxiliary power.

The vehicle 10 conserves energy by temporarily deactivating one or more components when the components are not in use. For example, the control module 54 determines whether the sliding door 18 has been opened by receiving a signal from one or more sensors 62 disposed along the sliding door 18 and/or the vehicle body 14. In some constructions the control module 54 determines whether the sliding door 18 has been opened based solely or partially on a detected coupling or de-coupling of the electrical components 58, based solely or partially on a detected coupling or de-coupling of the electrical contacts 34, and/or based solely or partially on signals received from the sensors 62. If the control module 54 has detected that the sliding door 18 has been opened, the control module 54 temporarily deactivates one or more of the electrical components 58 (e.g., an electrical component that is typically not used when the sliding door 18 is opened, such as the window motor). Temporarily deactivating the electrical component 58 saves battery power in the second battery 30. The deactivated electrical component 58 is reactivated either once a predetermined time period has passed, or once the sliding door 18 has been returned to its fully closed position.

In some constructions, the control module 54 waits a predetermined time period after the sliding door 18 has been opened before temporarily deactivating one or more of the electrical components 58. For example, in some constructions, the control module 54 waits for thirty seconds, one minute, five minutes, etc. after the sliding door 18 has been opened before one or more of the electrical components 58 are temporarily deactivated.

With continued reference to FIG. 2, in the illustrated construction, the vehicle 10 also conserves energy by keeping some or all of the electrical components 58, the control module 54, and the second interface 42 in a sleep or stand-by mode until a signal is sent from the first interface 38 and is received by the second interface 42. The sleep or stand-by mode reduces the amount of power drawn from the second battery 30, and thus saves battery power in the second battery 30.

In the illustrated construction, the vehicle 10 also conserves energy by automatically closing the sliding door 18 after a predetermined time period has elapsed. For example, the control module 54 monitors a time period during which the sliding door 18 has remained open (e.g., based on detection of signals from the sensors 62). If control module 54 determines that the sliding door 18 has remained open for a predetermined period of time (e.g., ten minutes, twenty minutes, etc.), the control module 54 activates one of the electrical components (e.g., the cinching latch) to close the sliding door 18. If the sliding door 18 remains open longer than the predetermined period of time, the second battery 30 is at risk for completely draining, and for the electrical components 58 to become non-operational. Thus, automatically closing the sliding door 18 after the predetermined period of time prevents the second battery 30 from completely draining, allows the second battery 30 to be recharged by the first battery 26, and also ensures that the electrical components 58 remain operational.

While the power system 22 described above is described in the context of a sliding door 18, in some constructions the same power system 22 is used on a pivoting door. For example, in a sedan, SUV, or other vehicle that does not include a sliding door 18, the power system 22 may be used on one or more of the pivoting doors of the vehicle. The pivoting door may include the second battery 30, the electrical contacts 34, the control module 54, the second interface 42, and one or more of the electrical components 58 (e.g., the window motor). The power system 22 operates in a similar manner with the pivoting door. For example, when the pivoting door is in a fully closed position, the electrical contacts 34 on the pivoting door and the vehicle body couple, thereby charging the second battery 30. When the pivoting door is opened, the second battery 30 provides the sole power to the control module 54, the second interface 42, and the electrical components 58.

Although the invention has been described in detail with reference to certain preferred embodiments, variations and modifications exist within the scope and spirit of one or more independent aspects of the invention as described.

What is claimed is:

1. A power system for a vehicle having a vehicle body and door, the power system comprising:

a first battery disposed on the vehicle body;
a second, rechargeable battery disposed on the door;
a sliding door battery management device disposed in the vehicle body that manages charging of the second battery;
a first electrical contact disposed on the vehicle body, wherein the sliding door battery management device is disposed between the first battery and the first electrical contact;
a second electrical contact disposed on the vehicle door, the first and second electrical contacts coupled to the first and second batteries such that when the door is in a fully closed position relative to the vehicle body the first and second batteries are electrically coupled to one another and the second battery is charged by the first battery, and when the door is not in a fully closed position the first and second batteries are electrically de-coupled from one another;
a door control module disposed on the door and coupled to the second battery; and
a plurality of electrical components disposed on the door and configured to be activated by the door control module;
wherein the door control module is configured to detect whether the door has been opened, wherein if the door control module detects that the door has been opened, the door control module is configured to deactivate one of the electrical components that is configured to be unused when the door is open;
wherein the electrical components include a door window motor, wherein the door window motor is configured to be unused when the door is open, and wherein door control module is configured to deactivate the door window motor if the door control module detects that the door has been opened.

2. The power system of claim 1, wherein the electrical components include a cinching latch.

3. The power system of claim 1, wherein when the door is not in a fully closed position, the second battery is the sole source of electrical power for the electrical components.

4. The power system of claim 1, further comprising a first wireless controller area network interface disposed on the vehicle body, and a second wireless controller area network interface disposed on the door, wherein the first wireless controller area network and the second wireless controller area network are configured to communicate wirelessly with one another.

5. The power system of claim 4, further comprising a vehicle controller area network disposed on the vehicle body, wherein the first wireless controller area network interface is coupled to the vehicle controller area network.

6. The power system of claim 5, further comprising a power sliding door module disposed in the vehicle body, wherein the first wireless controller area network is coupled to the power sliding door module.

7. The power system of claim 6, wherein the vehicle controller area network and the power sliding door module are both configured to provide one or more signals to the first wireless controller area network interface, such that the signals are relayed wireless via the first wireless controller area network interface to the second wireless controller area network interface.

8. The power system of claim 4, wherein the door control module is coupled to the second wireless controller area network interface.

9. The power system of claim 4, wherein the electrical components are configured to be in a sleep or stand-by mode until a signal is sent from the first wireless controller area network interface to the second wireless controller area network interface.

10. The power system of claim 1, wherein the vehicle is a minivan, and wherein the door is a sliding door, and wherein the first electrical contact is selected from a group consisting of a pad and a plunger.

11. The power system of claim 1, wherein the door is configured to automatically close if the door has been open for a predetermined period of time.

12. The power system of claim 1, wherein the door control module is configured to deactivate the electrical component that is configured to be unused when the door is open only if the door has been open for a predetermined period of time.

13. A method of operating a power system for a vehicle having a vehicle body and door, the method comprising:
engaging a first electrical contact on the vehicle body with a second electrical contact on the vehicle door by closing the vehicle door, the first electrical contact coupled to a first battery disposed in the vehicle body and the second electrical contact coupled to a second, rechargeable battery disposed in the door;
charging the second battery with the first battery after the first and second electrical contacts have been engaged;
managing the charging of the second battery with a sliding door battery management device coupled to and disposed between the first battery and the first electrical contact;
opening the door to disengage the first and second electrical contacts;
powering a plurality of electrical components disposed in the door with the second battery;
detecting, via a door control module disposed on the door, whether the door has been opened; and
upon determining that the door has been opened, deactivating one of the electrical components that is configured to be unused when the door is open,
wherein a motor for a window on the door is configured to be unused when the door is open, and wherein the step of deactivating one of the electrical components includes deactivating the motor for the window on the door.

14. The method of claim 13, wherein after opening the door, the second battery is the sole source of electrical power for the electrical components.

15. The method of claim 13, wherein the step of powering the electrical components includes powering a motor for a window on the door.

16. The method of claim 13, wherein the step of powering the electrical components includes powering a cinching latch on the door.

17. The method of claim 13, wherein the step of determining whether the door is open is based on signals received from sensors disposed on the vehicle body and door.

18. The method of claim 13, wherein the step of determining whether the door is open includes determining whether the door has been open for a predetermined period of time, and wherein the door control module in the door deactivates the electrical component that is configured to be unused when the door is open only if the door has been open for the predetermined period of time.

19. The method of claim 13, further comprising sending a signal from a first wireless controller area network interface disposed on the vehicle body to a second wireless controller area network interface disposed on the door to control the electrical components.

20. The method of claim 19, wherein the electrical components are in a sleep or stand-by mode until the signal is sent from the first wireless controller area network interface to the second wireless controller area network interface.

21. The method of claim 13, further comprising automatically closing the door after determining that the door has been open for a predetermined period of time.

22. The method of claim 13, wherein the step of deactivating the electrical component configured to be unused when the door is open occurs only after a predetermined time period has elapsed after the door has been opened.

23. A power system for a vehicle having a vehicle body and door, the power system comprising:
   a first battery disposed on the vehicle body;
   a second, rechargeable battery disposed on the door;
   a sliding door battery management device disposed in the vehicle body that manages charging of the second battery;
   a first electrical contact disposed on the vehicle body, wherein the sliding door battery management device is disposed between the first battery and the first electrical contact;
   a second electrical contact disposed on the vehicle door, the first and second electrical contacts coupled to the first and second batteries such that when the door is in a fully closed position relative to the vehicle body the first and second batteries are electrically coupled to one another and the second battery is charged by the first battery, and when the door is not in a fully closed position the first and second batteries are electrically de-coupled from one another;
   a door control module disposed on the door and coupled to the second battery;
   a plurality of electrical components disposed on the door and configured to be activated by the door control module;
   a first wireless controller area network interface disposed on the vehicle body; and
   a second wireless controller area network interface disposed on the door, wherein the first wireless controller area network and the second wireless controller area network are configured to communicate wirelessly with one another;
   wherein the door control module is configured to detect whether the door has been opened, wherein if the door control module detects that the door has been opened, the door control module is configured to deactivate one of the electrical components that is configured to be unused when the door is open, wherein the electrical components are configured to be in a sleep or stand-by mode until a signal is sent from the first wireless controller area network interface to the second wireless controller area network interface, and wherein the door control module is configured to deactivate the electrical component configured to be unused when the door is open only after the electrical component configured to be unused when the door is open has been removed from the sleep or stand-by mode.

24. A method of operating a power system for a vehicle having a vehicle body and door, the method comprising:
   engaging a first electrical contact on the vehicle body with a second electrical contact on the vehicle door by closing the vehicle door, the first electrical contact coupled to a first battery disposed in the vehicle body and the second electrical contact coupled to a second, rechargeable battery disposed in the door;
   charging the second battery with the first battery after the first and second electrical contacts have been engaged;
   managing the charging of the second battery with a sliding door battery management device coupled to and disposed between the first battery and the first electrical contact;
   opening the door to disengage the first and second electrical contacts;
   powering a plurality of electrical components disposed in the door with the second battery;
   detecting, via a door control module disposed on the door, whether the door has been opened;
   upon determining that the door has been opened, deactivating one of the electrical components that is configured to be unused when the door is open; and
   sending a signal from a first wireless controller area network interface disposed on the vehicle body to a second wireless controller area network interface disposed on the door to control the electrical components;
   wherein the electrical components are in a sleep or stand-by mode until the signal is sent from the first wireless controller area network interface to the second wireless controller area network interface, and wherein the step of deactivating the electrical component configured to be unused when the door is open occurs only after the electrical component configured to be unused when the door is open has been removed from the sleep or stand-by mode.

* * * * *